Figure 4:
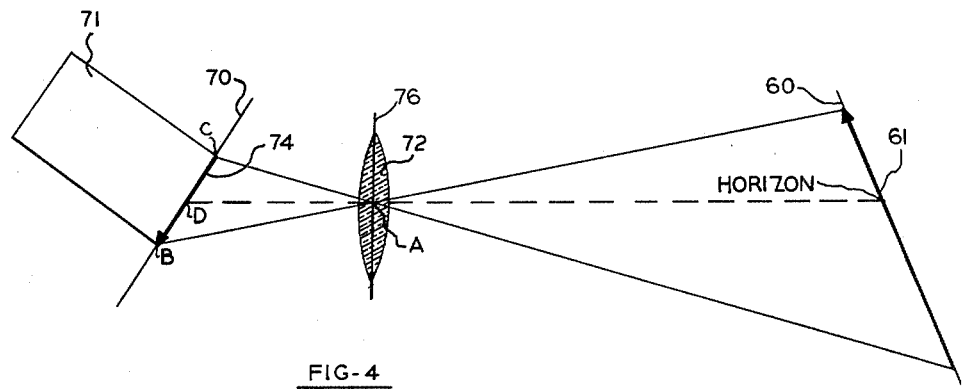

Jan. 8, 1963   H. S. HEMSTREET   3,071,875
METHOD AND MEANS FOR CORRECTING PARALLAX
Filed Feb. 12, 1959   3 Sheets-Sheet 1
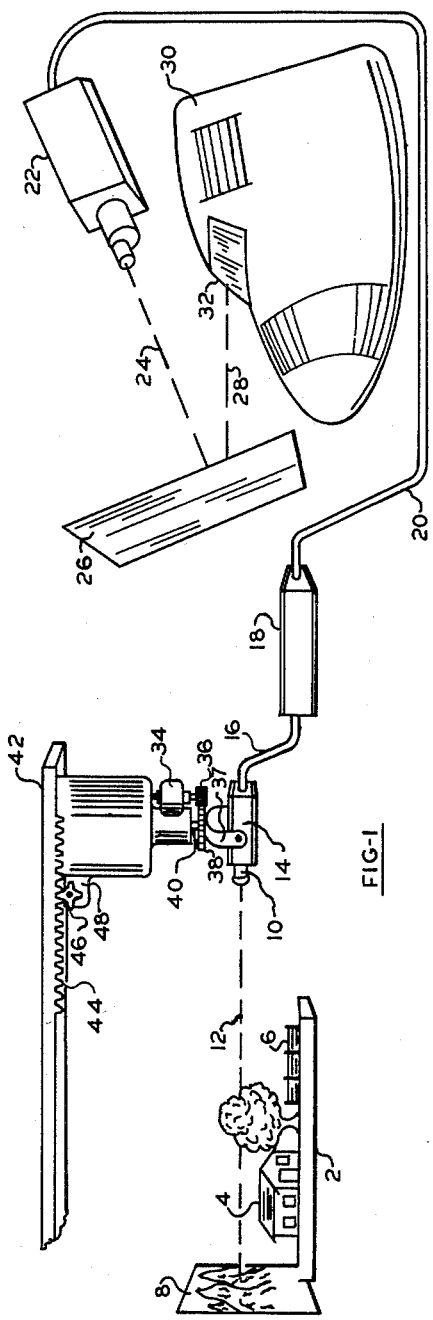
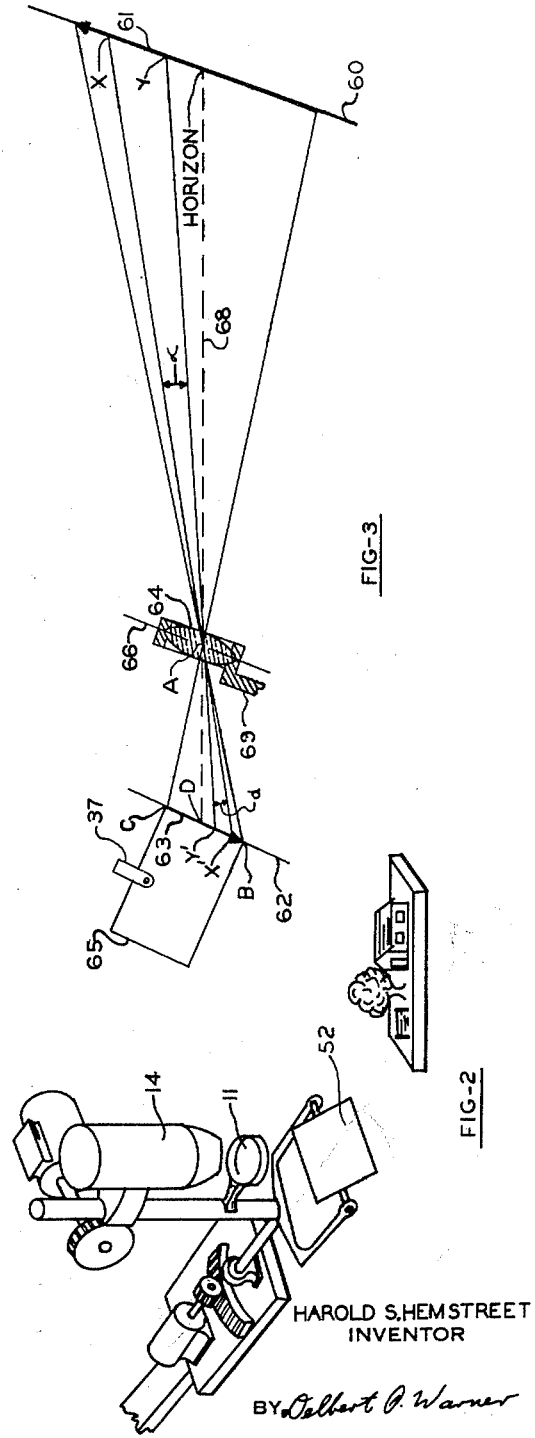
HAROLD S. HEMSTREET
INVENTOR
BY Delbert P. Warner
ATTORNEY

HAROLD S. HEMSTREET
INVENTOR

BY Delbert O. Warner

ATTORNEY

HAROLD S. HEMSTREET
INVENTOR

BY Delbert A. Warner
ATTORNEY

United States Patent Office 3,071,875
Patented Jan. 8, 1963

3,071,875
METHOD AND MEANS FOR CORRECTING
PARALLAX
Harold S. Hemstreet, Binghamton, N.Y., assignor to General Precision, Inc., Wilmington, Del., a corporation of Delaware
Filed Feb. 12, 1959, Ser. No. 792,772
10 Claims. (Cl. 35—12)

This invention relates to a method and means for correcting errors in visual displays due to parallax, and more particularly, to systems for use in correcting errors due to parallax in projected displays of simulated ground terrain for flight simulators and like apparatus.

The invention will be described in connection with a closed circuit television system used with flight simulators, but it should be understood that it is applicable to other systems which may be used for other purposes, such as motion picture projection systems, still projection systems, and other display systems which do not employ projectors.

In the ground trainer art it has long been known that one may use a model or a miniature ground scene to provide a ground scene display in connection with the operation of a grounded trainer, and thus to increase the realism in grounded trainer simulation equipment. At an early date, systems were devised in which periscopes were made movable relative to a model scene and were used to transmit images for observation by a student within a flight trainer. By providing controls to move the periscope relative to the model scene in the same way that an aircraft would be moved relative to the ground by similar controls, a suitable scene could be produced for observation by the student operating the controls.

In order to present a realistic picture to the student with such systems, it was necessary to rotate the periscope in accordance with simulated bank angle, pitch angle and heading as well as to move the periscope in accordance with simulated aircraft translation, along a set of three dimensional axes, so that optical systems utilized with such periscopes were necessarily very complex. Furthermore, available optical elements dictated that the angular field be very small, and required that the student peer into a periscope. This use of a periscope is undesirable, because it is inherently unrealistic and prevents the student from seeing instruments on the instrument panel of the grounded trainer.

An optical system which transmits a picture from the input end of a movable periscope for observation by a student might be termed a "light relaying" system. With the advent of practical closed-circuit television apparatus, it became possible to employ a television image relaying system in place of the prior art optical or "light relaying" systems. Hence in recent years, visual displays have been devised which include a television camera, a television projection receiver, and a screen. The television camera lens system is moved with relation to a model scene in the same way that the aircraft being simulated would move with respect to the ground. Suitable signals are then provided by the television camera for projection by the television projection receiver. This system makes it possible to project a fairly realistic picture on the screen for observation by a student within a grounded trainer.

Servo mechanisms may be used for moving the television camera, such servo mechanisms being responsive to data outputs of conventional flight simulators for positioning the camera pick-up tube with relation to the miniature ground model. In some instances, mirrors and lenses have been used to fold the optical system so as to simplify motion of the television camera with relation to the model scene. For example, U.S. Patent No. 2,591,752 suggests use of a tiltable and rotatable mirror for use with a periscope visual display system. The use of a mirror to fold the optical path to the camera of a closed circuit television system used with an aircraft simulator display system has been shown in the copending application of Dr. Robert A. Woodson entitled "Remote Entrance Pupil" Serial Number 721,758 filed on March 17, 1958 and assigned to the same assignee as the instant invention.

In the usual closed circuit television system used with flight trainers, the television projector is located above the cockpit to prevent the trainer fuselage from interfering with the projected picture. The projector is usually located at a greater distance from the screen than the pilot in the trainer cockpit, since the angular field of the television projector is less than the angular field encompassed at the television camera lens. Insofar as the projection distance and the viewing distance from the screen are concerned, well known principles have been followed as set forth hereinafter.

The student's eye, in such a system, in the past has been displaced laterally and below a normal passing from the projector to the screen and perspective distortion has occurred in the projected image as viewed from the cockpit. This perspective distortion in due to parallax. It may be explained as arising because any arbitrarily selected pair of points in the optic space viewed by the camera and projected as two points on the screen subtend an angle at the camera lens which is different from the angle subtended by the same two points on the screen when viewed from the student's viewpoint. In general, when seen by the student, the upper part of the picture above the simulated horizon has been too small, and the lower part below the horizon has been too large.

It has been suggested heretofore than the sweep circuits on either the television camera or the television projector be altered from their normal linear sawtooth form to a nonlinear form, the shape of which can be calculated so as to correct the above mentioned perspective error. While such a technique is sound on a purely theoretical basis, it is difficult to generate the required non-linear sweeps with suitable precision, and of course, such a system requires substantially more electronic apparatus. Furthermore, the use of non-linear sweeps tends to degrade the picture quality, since the scan lines are unevenly spaced and are of unequal length.

None of these prior art devices presents an entirely adequate visual display, therefore, it is a primary object of this invention to provide a method and means for correcting perspective errors due to parallax.

It is an additional object of this invention to provide an improved visual display system for ground flight trainers.

It is yet another object of this invention to provide means for eliminating certain errors present in an observer's view of a projected picture due to differences between the placement of the original camera lens relative to a physical object and the placement of the viewpoint, or the observer, relative to the projected image of that physical object.

It is a further object of this invention to provide an optical system for correcting parallax by means of which the relative position of any two points in a projected image with respect to the viewpoint remains unchanged from the relative position of the corresponding points in the original object relative to the camera lens.

The foregoing objects and others ancillary thereto I prefer to accomplish as follows:

According to a preferred embodiment of my invention employing a closed circuit television system, a television projector is slightly tilted in order to provide clearance for the projected image past a simulator cockpit and the face of the television camera is off-set from the optical axis of a pick-up lens used within the television camera. The amount of offset or lateral displacement is chosen so that the horizon of the object being picked up will project back through the lens onto the center of the camera tube in spite of the fact that the camera tube has been tilted. The image formed in the camera is then projected and a viewpoint is selected so that a horizontal line will pass between the viewpoint and a point on the projected horizon. The viewpoint is selected so that the angle subtended from the viewpoint by any two points on the projected image will equal the angle subtended at the camera lens by the corresponding points in the physical object. Provision is also made to insure that the projector projects the image from the television camera at right angles to the screen. My system, properly applied, will provide an image which is free of parallax in any optical projection system and may be adapted to any non-projection optical display system in which the position of the viewpoint relative to the image is different from the position of the camera relative to the object.

Figure 5:
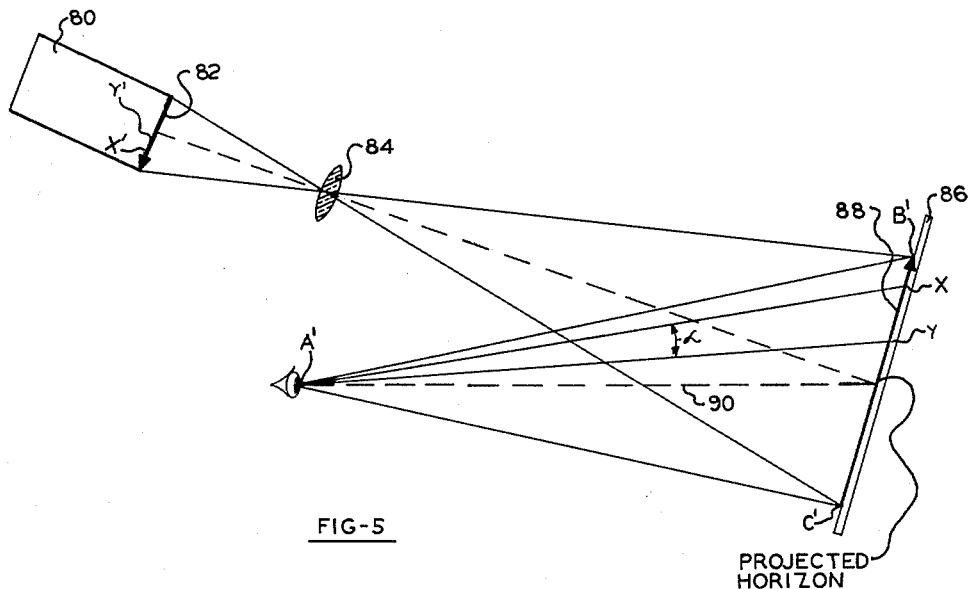
Figure 6:
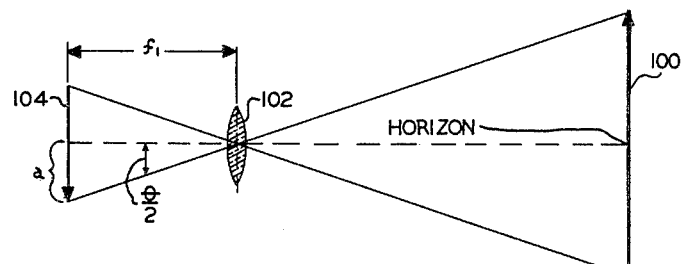
Figure 7:
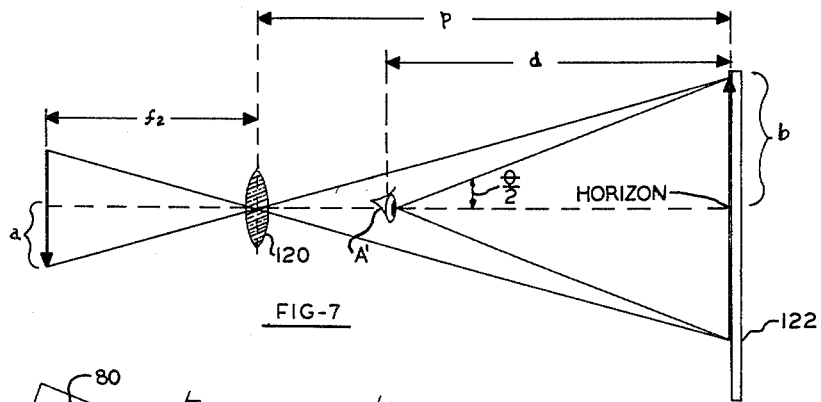
Figure 8:
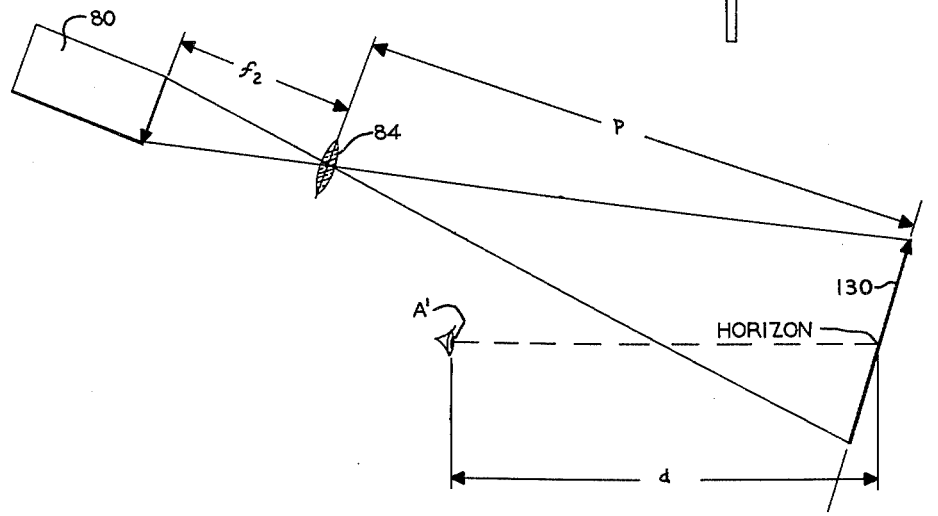

The novel features that I consider characteristic of my invention are set forth with particularity in the appended claims. The invention itself, however, both as to its organization and its method of operation, together with additional objects and advantages thereof, will best be understood from the following description of specific embodiments when read in connection with the accompanying drawings, in which:

FIG. 1 is a partial perspective view of a closed circuit television system employing this invention, FIG. 2 is a perspective view of a light folding device for use with the system in FIG. 1, FIG. 3 illustrates the essential characteristics of an optical system for obtaining an image for use in this invention in a desired form for transmission to the projector, FIG. 4 is a sectional view illustrating a variation in the relationship between the object, the lens and the image of FIG. 3, FIG. 5 is a sectional view taken through a projector lens illustrating a way for projecting the intentionally distorted image of FIG. 3 or of FIG. 4 to provide an image which will be realistic when viewed from a selected viewpoint, FIG. 6 is a sectional view through a camera lens illustrating certain relationships between an object, a lens, and an image of the object, FIG. 7 is a sectional view through a projector lens and it shows, when taken together with FIG. 5, the relationship between various important dimensions of projector and camera lenses as well as their relationship with the position of the viewpoint, and FIG. 8 is a view showing in general the relative positions that the projector, the screen, and the observer must assume in order for this invention to function as a practical system.

Turning to the figures again and considering them in more detail, we find a closed circuit television system in FIG. 1 such as might be used in the practice of this invention. Starting at the left in FIG. 1 we find a block representing a platform or table labelled 2 which can support various objects that have been scaled down as indicated at 4 and 6. This table 2 has scenes such as 8 attached thereto which represent various distant scenes to provide increased realism to the image produced by lens elements in the barrel 10, hereinafter called the lens. A dashed line 12 is shown to illustrate the line of sight towards the horizon as seen from lens 10.

The lens 10 in a closed circuit television system would be coupled mechanically to a camera represented here by the block 14. The camera 14, being a television camera, could provide an electrical signal through a cable 16 to appropriate controls, amplifiers and the like included in the box shown at 18 and thence through a further cable 20 to a television projection system at 22. The television system 22 employs an optical projector to project the picture, picked up by the television camera 14, along a line 24 to a viewing screen 26, the back portion of which is shown in FIG. 1. The projected image appearing on screen 26 would be reflected in a direction generally along line 28 to the cabin of a simulated aircraft, indicated at 30, in which a student pilot may sit and observe the picture through a transparent canopy 32. It is apparent that the image projected onto screen 26 will appear slightly distorted from a viewpoint in the cabin 30 due to parallax, and it will be recalled that it is an object of this invention to correct that distortion. The following paragraphs should be considered in order to obtain a complete understanding of the scope and function of this invention.

It is possible, with a system of this kind, to provide a very realistic picture of the model to be viewed by a student pilot on the screen 26. It is possible to give the impression of motion in the picture on screen 26 and to vary the size and apparent position of the image, as seen by the student pilot, within very wide limits by motorizing the mechanism supporting the camera 14 so that it can move with the six degrees of freedom characteristic of an aircraft. This means that it must be possible to change the position of the lens of the television camera with respect to its altitude, range and lateral position, relative to the models. It must also be possible to represent roll, pitch, and yaw about the X, Y and Z axes of the aircraft itself. The provision of all the signals necessary to operate motors which can control the position of the optical system to simulate the attitude and position of an aircraft in space obviously would require a great deal of equipment and is too complex a subject for complete disclosure in connection with this invention. Consequently, no attempt is made here to illustrate each of the six degrees of freedom nor to show how they are all provided in detail.

In order to provide some idea as to the mechanical components necessary to determine position and attitude, a motor is shown at 34 having a shaft to which a gear 36 is coupled. The gear 36 in turn meshes with a second gear 38 which is coupled to turn a shaft 40 in response to motion of the motor 34 to position the camera and optical system about said shaft 40 which represents the Z axis of an aircraft. A similar motor may be provided to turn an aircraft about its X axis, or cause it to roll, and yet another motor and gear system may be employed to provide for rotation about the aircraft Y axis to provide pitch. To provide what might be called the three degrees of freedom representing translation; a rack and pinion, operated by a suitable electric motor, may be employed to translate the system linearly along each of three axes. To do this three racks are aligned along mutually perpendicular axes. One such rack and pinion is shown attached to an overhead railing 42, in which the rack is labelled 44, the gear 46, and a controlling motor is located at 48.

It will be recognized that control of all the motors referred to in the preceding paragraphs may be affected by an aircraft simulator which is responsive to controls located in the cabin 30, under the control of the student pilot. This makes it possible for the student to appear to approach the models at 4, 6 and 8 and to maneuver with respect to those models much as he could fly an airplane with respect to similar ground terrain. More details as to the kinds of equipment required to provide such controls for a visual system are set forth in the copending U.S. application of Harold S. Hemstreet entitled "Method and Apparatus for Producing Visual Display," which was filed on April 22, 1955 and given Serial Number 503,211 and assigned to the same assignee as the instant application.

The lens and camera system may be employed in a somewhat different system, such as is illustrated in FIG.

2, wherein the light beams from a model are folded, or reflected, by a mirror 52 before impinging on the lens 11 in the camera 14. A system of this latter kind is particularly desirable where it is found necessary to approach very close to the model, since both the camera and the optical system tend to be quite large when considered in relation to the dimensions which might be used for the model. In one construction which employed the apparatus of FIG. 2 a scale of 1/300 was used so that in an aircraft in which the pilot's eyes were 15 feet from the ground, while the aircraft was taxiing on the field, the center of the lens had to be within 0.6 of an inch of the surface. A more detailed discussion of the use of the apparatus in FIG. 2 will be found in U.S. application No. 721,758 by Robert A. Woodson, filed March 17, 1958 and assigned to the same assignee as the instant invention and entitled "Remote Entrance Pupil."

A closed circuit television system, such as that disclosed in FIG. 1, presents a fairly satisfactory image on screen 26, however, as in all uncorrected optical systems where there is more than one optical path and the paths do not coincide, there is an error due to parallax. This error is seen largely as a distortion of perspective from the standpoint of the student pilot in the mock-up cabin at 30. This distortion is sufficiently great so that it tends to decrease the realism which it is the purpose of the quite expensive system illustrated in FIG. 1 to provide.

A method and the basic apparatus needed for correcting the error due to parallax is shown in FIGS. 3, 4, 5 and 8.

FIG. 3 illustrates the application of this invention in order to provide for the initial steps necessary for the correction of this error due to parallax. In FIG. 3 an object 61, in an object plane at 60 (the plane of best focus is shown), is projected through a lens shown in section at 64 to form an image 63 on the image plane 62 which may be in the face of the vidicon tube of a television camera 65. The camera may be supported by a gimbal 37 as shown in FIG. 1 or by a support such as that in FIG. 2 and the lens 64 will be attached to the camera by a suitable lens tube such as 10 in FIG. 1. The lateral position of the lens 64 relative to the face of the camera 65 may be changed by moving the element 69. In FIG. 3 the image plane at 62 and the plane 66 through the lens 64 are parallel and each is perpendicular to the respective optical axis of the image and of the lens. A horizontal dashed line is shown at 68 which represents a line through the horizon. The image plane is tilted at a selected angle as is the plane 66 through the lens 64. A perpendicular line through the center of the image and the optical axis of the lens are offset from each other an amount sufficient such that the image of a point on the horizon is projected back along the horizontal line 68 and through the center of the lens 64 to the center of the image 63. A triangle may be formed by drawing lines from the center of the lens A to the opposite ends of the image at 63. The opposite ends of the image may be labelled B and C respectively and a line may also be projected from A to a point D which represents a point on the horizon as projected in the image.

The significance of this little bit of geometry to the present invention will be set forth in more detail in connection with the discussion of FIG. 5. It may be noted now, however, that the image 63 as viewed from a point at A will look just like the object at 61, as viewed from point A except that the image is inverted. It follows then, that one way to correct for parallax is to reproduce the optical relationships of the triangle ABC in a projection system with an inverted projected image. Such a system will be set forth in connection with FIGS. 5 and 8.

An alternative arrangement (to that of FIG. 3) is shown in FIG. 4 in which an image plane 70, which may be on the face of a vidicon tube in a camera 71, is tilted at an angle from the horizontal as was the image plane in FIG. 3, but the camera lens 72 is kept in a position such that its optical axis is directed along the horizon. The axis of lens 72 is offset sufficiently again so that the horizon of the object indicated at 61 will project to the center D of an image 74. It will be noted that the top of the plane of best focus 70 in FIG. 4 is tilted toward the camera. The amount of tilt is chosen so that the object planes 60 and 70 and a plane 76 through the lens will meet in a common line as required by optical theory. The tilt of plane 70, as shown, is exaggerated somewhat from the actual tilt of the face of a television projector tube in a system of this kind and planes 60, 70 and 76 have not actually been constructed to meet in a common line. A chief advantage of the construction of FIG. 4 over that shown in FIG. 3 is that there is a slight reduction in the angular field requirements imposed on the lens.

An image such as 63 or 74 may be provided, through appropriate electrical circuits from a vidicon tube placed in the image plane to a television projecting system designated as 80 in FIG. 5. This television projecting system provides an image for projection at 82 which is projected through a lens, shown in section at 84, along an axis perpendicular to a screen at 86. In this case the face of the kinoscope and the face of the screen are placed in parallel so that the image 88 projected on the screen 86 is an enlarged reproduction of the distorted image 63 or 74 as reproduced at 82. The result of this direct projection is the creation of an image at 88 presenting a warped perspective as viewed from most viewing points or viewpoints in space. However, it can be shown that there is one point in space, designated as A' in FIG. 5, from which an observer looking at the image 88 will see an accurate reproduction of the object 61. First of all, the viewpoint A' must be selected along a line constructed horizontally left from the face of the screen from a point on the projected horizon so that the horizon has an appropriate position. Secondly, the eye of the observer must be located at a sufficient distance from the face of the screen to subtend an angle between any two points in the image 88 equal to the angle subtended by the lens 64 with respect to the corresponding two points in the object 61. In other words, the angle designated $\alpha$ in FIGS. 3 and 5 and drawn respectively from the lens 64 and the viewpoint A' to points X and Y, where the points X and Y represent any two corresponding points on the object and the projected image, must be equal. The angle between lines drawn from A to the points X' and Y' must also equal $\alpha$.

This requirement may be restated by saying that the position of the observer or the viewpoint A' is chosen in such a way that triangle ABC is similar to triangle A'B'C'. This means that the triangles must have corresponding angles, and that the view from A' toward the image 88 will appear to be the same as the view from A in FIG. 3 toward the image 63, except that image 63 is inverted. This is in accordance with a prior statement made in connection with the explanation of the geometry of FIG. 3.

Probably the quickest way to affect this result in practice is to move the viewpoint A' away from the image 88 along the horizon line 90 until a point is reached at which the angle B'A'C' is equal to the angle BAC.

It will be recognized that some of the above statements only hold true when the focal length of the lens on the camera and the focal length of the lens on the television projector are equal. These lenses will not ordinarily have the same focal length, since projectors ordinarily have a narrow field of view and a correspondingly long focal length while cameras ordinarily have a wider field of view. The effect of the differences in focal length is shown in FIG. 6 and FIG. 7, in which the camera is designated as having a focal length of $f_1$ in FIG. 6 and the projector is designated as having a focal length of $f_2$ in FIG. 7.

In FIG. 6 the relationships between an object which is indicated by an arrow and labelled 100, a lens 102 which is shown in section, and the image 104 which is shown as an arrow at the left are illustrated. The focal length of the lens 102 is labelled $f_1$ and the half of the image lying below the horizon line is labelled $a$, and one half of the angle subtended by either the object or the image from the lens 102 is labelled as $\theta/2$ so that the relationship can be expressed that $\tan \theta/2 = a/f_1$.

A plurality of geometrical relationships is set forth in FIG. 7 also. The image to be projected in FIG. 7, which is shown as a small arrow at left, is chosen to be of the same length as the image in FIG. 6, so that the letter $a$ designates the same length in both figures. The focal length of the lens shown in section at 120 is designated as $f_2$. The distance from the center of the lens 120 perpendicular to the face of the screen 122 is designated as $p$. One-half of the projected image, corresponding to part $a$ of the image to be projected, is labeled $b$ in FIG. 7, and the distance from the screen to the viewpoint of an observer located along the horizon is designated as $d$.

Considering the relationships set forth in connection with FIG. 6 and FIG. 7, it is possible to determine at what distance $d$ the viewpoint of the observer must be located from the screen 122 in order to provide a clear and accurate view. This relationship may be established by the following argument:

The location of the viewpoint A' (at the eye) is chosen so that the following relationship is true:

$$\tan \frac{\theta}{2} = \frac{a}{f_1} = \frac{b}{d} \tag{1}$$

The following relationship is apparent from the construction in FIG. 7:

$$\frac{a}{f_2} = \frac{b}{p} \tag{2}$$

Equations 1 and 2 may be rearranged and combined as:

$$\frac{a}{b} = \frac{f_1}{d} = \frac{f_2}{p} \tag{3}$$

from which the following relationship follows:

$$d = p \frac{f_1}{f_2} \tag{4}$$

Equation 4 clearly expresses the relationship which must obtain between the focal lengths of the lenses, the distance of the projector lens from the projected image, and the distance from the observer to the projected image, in order to present an accurate picture to the observer.

Attention is now directed to FIG. 8 which illustrates the application of the relationships shown in Equation 4 to the invention as previously described in connection with FIG. 5. In FIG. 8 the distance of the observer or the viewpoint A' from the center of the projected image 130 is chosen to be equal to $d$, to correspond with the symbols used in connection with Equation 4. It follows from Equation 4, that if the focal length $f_2$ of the projector is known, the distance $p$ from the projector lens to the screen is known, the focal length of the camera $f_1$ is known, the camera is set up in accordance with the system described in connection with FIG. 3 or FIG. 4, and the projector is set up in accordance with the principles illustrated in FIG. 5, that the distance $d$ from the viewpoint A' to the centre of the projected image as measured along a horizontal line from the viewpoint to the horizon may be determined. The application of this equation yields a unique solution to the question as to where the viewpoint should be located in order to provide a view of the image 130 which will be free of distortion due to parallax and at the same time take into account the differences between the optical systems of cameras and projectors.

In the interest of simplicity in describing this invention, mechanical means for positioning the lenses, cameras and projectors in FIGS. 4, 5 and 8 have not been illustrated in every case. It will be recognized, however, that the apparatus employed in FIGS. 1, 2 and 3 may be used to provide support for the cameras and projectors and to provide for lateral motion between the axes of the lenses and lines drawn perpendicular to the centers of the images in the focal planes.

It will thus be seen that the objects set forth above, among those made apparent from the preceding description, are efficiently attained. Since certain changes may be made in carrying out the above method and in the constructions set forth without departing from the scope of the invention, it is intended that all matter contained in the above description or shown in the accompanying drawings shall be interpreted as illustrative and not in a limiting sense.

Having described my invention, what I claim as new and desire to secure by Letters Patent is:

1. In a visual display system for flight simulator apparatus for correcting perspective in an image having its horizon projected perpendicular to a screen tilted from the vertical but having its horizon viewed along a horizontal line of sight which forms an acute angle with said screen, comprising means for modifying the image to be projected including means to parallelly shift the axis of the camera which provides said image and the axis of the optical system of said camera out of alignment with each other, and means controlling the aiming means of said camera in accordance with the amount of said shift.

2. Apparatus for correcting for errors of perspective resulting from a difference in the placement of a camera relative to an object and of an observer relative to a projected image of said object comprising optical means for providing a distorted image within said camera, said optical means including a lens and a focal plane having central axes, means for tipping said central axes of said focal plane and said lens out of the horizontal by a selected angle, means for maintaining said axes in parallel and offsetting one from another to provide a horizontal path from a point on the horizon of the object to a point on a horizontal line in the center of the focal plane, means for providing a flat surface having an axis through its center tilted at an angle from the horizontal equalling said selected angle, and means including a projector and means for conveying said distorted image thereto for providing a reproduction of said distorted image on said flat surface, whereby a viewpoint permitting a view of the distorted image which is free of distortion may be chosen on a point along a horizontal line passing through the horizon of said reproduction of said distorted image.

3. A method for correcting errors in a projected image as seen from a viewpoint laterally disposed from the source of projection of said image comprising the steps of supplying a projection image, providing a correcting distortion in said projection image by altering the optical path between an object and said projection image, the steps of altering said optical path including tilting the focal plane of said projection image and adjusting the optical path to present a horizontal path between points on the horizon of the projection image and points on the horizon of the object, projecting said projection image in a direction normal to an image plane to provide said projected image, and fixing a viewpoint horizontally from the horizon of said projected image at an angle to said image plane equal to the angle between the projection image and the horizontal path and at a distance sufficient to provide the appearance of realistic size to the projected image.

4. Apparatus for providing an accurate view of the projected image of a subject comprising means for distorting an initial image of said subject, said means for distorting including a lens and a camera the optical axes of which are tilted from the horizontal and displaced from each other by an amount sufficient to generate an acute angle between the focal plane and a line joining a point on the horizon of the subject with the image of said point on said focal plane, a projection screen tilted at said acute angle away from the horizontal projector, means for projecting said distorted initial image at right angles to the face of said projection screen for viewing from said acute angle to said screen, and means for conveying said distorted initial image from said camera to said projector means.

5. In a visual display system for flight simulator apparatus for correcting for errors of perspective due to parallax in a projected image as seen by an observer comprising a camera for providing distorted images to be projected, means included in said camera for distorting said desired image to be projected, said means for distorting including a lens and a photosensitive surface the optical axes of which are tilted from the horizontal and displaced from each other by an amount sufficient to generate an acute angle between said photosensitive surface and a line joining a point on the horizon of the subject with the image of said point on said surface, viewing screen means, projector means for projecting said distorted images onto said screen whereby an observer from a unique position along a line drawn at said acute angle from said screen is enable to obtain a view of the images free of distortion, and means for conveying said distorted images from said camera to said projector means.

6. In a visual display system for flight simulator means comprising a closed circuit television system including a camera and a projector, means for conveying images from said camera to said projector, a projection screen, a viewing point located at an acute angle to said projection screen, means offset from the viewing point for supporting said projector, means for distorting an image of an object, said means for distorting including a lens and a camera the optical axes of which are tilted from the horizontal and displaced from each other by an amount sufficient to generate an acute angle between the focal plane of said camera and a line joining a point on the horizon of the subject with the image of said point on said focal plane, said projector projecting said distorted image perpendicularly onto said projection screen to enable an observer at said viewing point to see an accurate image of said object.

7. In a visual display system for flight simulator means comprising closed circuit television apparatus including pickup and projection apparatus, means for conveying images from said pickup apparatus to said projection apparatus, means for positioning said pickup apparatus with respect to a model in accordance with the position of an aircraft with respect to an actual object as represented by the model, means for positioning the projection apparatus at a point offset from the viewing position of a student pilot for providing a projected image, and optical means for correcting parallax caused by the difference between said viewing position and the position of said projection apparatus, said means for correcting parallax including means for distorting an image of an object for projecting, said means for distorting including a lens and a camera the optical axes of which are tilted from the horizontal and displaced from each other by an amount sufficient to generate an acute angle between the focal plane of said camera and a line joining a point on the horizon of the subject with the image of said point on said focal plane equal to the angle between the student pilot's line of sight to the horizon of said projected image and the plane of said projected image, said optical means providing that any two points in the projected image have the same relative position when seen from the viewing position as the corresponding points in the original object have relative to the pickup apparatus.

8. In a visual display system including a camera, a projector and a screen, means for correcting errors due to parallax comprising means in said camera for offsetting the axis of the camera lens from an axis through the center of the focal plane in said camera, means for tilting the axis of said lens and the axis of said focal plane at an angle to the vertical to project the horizon of the object horizontally to the center of the focal plane to form an image, means for supplying said image to said projector, means for tilting the perpendicular to the face of the screen at said angle to the vertical, and means for positioning said projector perpendicular to the center of said screen to project said image thereon, whereby an observer located at a predetermined distance along a horizontal line through the horizon of the image on said screen will see an image which is free of distortion due to parallax.

9. In a visual display system, apparatus for correcting the errors introduced into a projected image as seen by an observer due to differences in the relative position of an observer from a projected image and of a camera from the subject comprising, means for offsetting the optical axis of the lens in the camera from an axis through the center of the camera, means for parallelly displacing said two axes to provide a horizontal path from a point on the horizon of the object through the lens to the center of the camera image, a projector for projecting said camera image along an axis perpendicular to said screen to form a projected image including a plurality of points on said screen, means for conveying said camera image to said projector, and means for supporting said projector and said screen in attitudes at an angle to the horizontal corresponding to that of said two axes and permitting an observer to view said projected image on said screen from a point along a horizontal line through the horizon of said projected image, said combination making it possible to select a unique viewpoint along said horizontal line from which any pair of points projected on said screen will subtend an angle equal to that subtended from the lens by the corresponding points in the camera image.

10. Apparatus for correcting for perspective errors due to parallax comprising a camera and a projection screen, means in said camera for producing controlled distortion of images in the image plane of said camera, means for positioning said projection screen at a selected angle to the horizontal, means for tilting said camera at an angle equal to said selected angle, said means for producing distortion including supports for said lens to shift the axis of the lens laterally from an axis through the center of the image plane to distort the image and maintain a horizontal line of sight between the horizon in said image and the horizon of the object, and a projector for projecting said distorted image on said projection screen to enable an observer at a selected distance on a horizontal line through the horizon of said projected image to see an image free of distortion due to parallax and means for conveying said distorted image from said camera to said projector.

References Cited in the file of this patent
UNITED STATES PATENTS

| | | |
|---|---|---|
| 321,139 | Samuels | June 30, 1885 |
| 1,199,460 | Featherstone | Sept. 26, 1916 |
| 1,626,591 | Ames | May 3, 1927 |
| 1,651,574 | Beechlyn | Dec. 6, 1927 |
| 1,898,905 | Seitz | Feb. 21, 1933 |
| 1,952,522 | Warmisham | Mar. 27, 1934 |
| 2,022,366 | Boeching | Nov. 26, 1935 |
| 2,023,970 | Newman | Dec. 10, 1935 |
| 2,073,370 | Goldsmith et al. | Mar. 9, 1937 |
| 2,187,803 | Griffin | Jan. 23, 1940 |
| 2,227,070 | DeBoer | Dec. 31, 1940 |
| 2,293,598 | Drucker | Aug. 18, 1942 |
| 2,448,568 | Zwillinger et al. | Sept. 7, 1948 |
| 2,516,069 | Newhouse et al. | July 18, 1950 |
| 2,521,571 | Du Mont et al. | Sept. 5, 1950 |
| 2,607,268 | Bartz | Aug. 19, 1952 |
| 2,614,460 | Miller | Oct. 21, 1952 |
| 2,795,996 | Sauer | June 18, 1957 |
| 2,838,848 | Bergstad et al. | June 17, 1958 |